United States Patent [19]
Hyppanen

[11] Patent Number: 5,840,258
[45] Date of Patent: Nov. 24, 1998

[54] METHOD AND APPARATUS FOR TRANSPORTING SOLID PARTICLES FROM ONE CHAMBER TO ANOTHER CHAMBER

[75] Inventor: Timo Hyppanen, Karhula, Finland

[73] Assignee: Foster Wheeler Energia Oy, Helsinki, Finland

[21] Appl. No.: 89,810

[22] Filed: Jul. 12, 1993

Related U.S. Application Data

[63] Continuation-in-part of Ser. No. 41,571, Apr. 5, 1993, Pat. No. 5,332,553, Ser. No. 41,580, Apr. 5, 1993, Pat. No. 5,345,896, Ser. No. 66,277, May 26, 1993, Pat. No. 5,540,894, and Ser. No. 973,396, Nov. 10, 1992.

[51] Int. Cl.⁶ ............................. F27B 15/08; B01J 8/18
[52] U.S. Cl. .................. 422/142; 422/145; 422/146; 422/147; 122/40; 165/104.16
[58] Field of Search ........................ 422/141, 142, 422/146, 241, 145, 147; 34/57 A; 110/245; 431/7, 170; 432/59; 165/104.16; 122/4 D

[56] References Cited

U.S. PATENT DOCUMENTS

| | | | |
|---|---|---|---|
| 2,819,890 | 1/1958 | Rosa et al. ........................... | 34/57 A |
| 2,985,515 | 5/1961 | McKinley ............................. | 422/143 |
| 3,859,963 | 1/1975 | Roberts et al. ...................... | 122/4 D |
| 4,333,909 | 6/1982 | Stewart et al. ....................... | 422/141 |
| 4,399,618 | 8/1983 | Rydstad ................................ | 34/57 A |
| 4,538,549 | 9/1985 | Stromberg ............................ | 122/4 D |
| 4,688,521 | 8/1987 | Korenberg ............................ | 122/4 D |
| 4,856,460 | 8/1989 | Weid et al. ........................... | 122/4 D |
| 4,896,717 | 1/1990 | Campbell, Jr. et al. ....... | 165/104.16 X |
| 4,915,061 | 4/1990 | Garcia-Mallol ..................... | 122/4 D |
| 5,034,197 | 7/1991 | Potinkara ....................... | 122/4 D X |
| 5,069,171 | 12/1991 | Hansen et al. ..................... | 122/4 D |
| 5,202,099 | 4/1993 | Boone et al. ........................ | 422/310 |
| 5,341,766 | 8/1994 | Hyppanen ............................ | 122/4 D |

*Primary Examiner*—Jill Warden
*Attorney, Agent, or Firm*—Nixon & Vanderhye P.C.

[57] ABSTRACT

Solid particles are transported from a first chamber (e.g. combustion chamber of a fluidized bed reactor) to an adjacent second chamber (e.g. a transporting and/or processing chamber) by providing a solid flow gas seal, a controllable solid flow valve, or both in a partition between the chambers. Transporting gas is introduced into the first chamber to transport solid particles as multiple solid flows from the first chamber to the second chamber. A number of narrow passages in the partition wall disposed one on top of the other, and having a height to length ratio of less than 0.5, less than 50 mm, act as the gas seal and controllable solid flow valve in the partition. The transporting gas may be introduced through the bottom of the first chamber, a side wall opposite to the partition wall, or both, and the partition wall may be lined with refractory adjacent the first chamber with passages in the refractory lining being made of combustible material which is burned away during heating of the refractory lining. The passages may also slant upwardly slightly from the first chamber to the second chamber, e.g. about 15 degrees.

24 Claims, 5 Drawing Sheets

METHOD AND APPARATUS FOR TRANSPORTING SOLID PARTICLES FROM ONE CHAMBER TO ANOTHER CHAMBER

CROSS REFERENCE TO RELATED APPLICATIONS

This application is a continuation-in-part of U.S. application Ser. No. 08/041,571, U.S. Pat. No. 5,352,553, U.S. application Ser. No. 08/041,580, U.S. Pat. No. 5,345,896, and U.S. application Ser. No. 08/066,277 U.S. Pat. No. 5,540,894 filed Apr. 5, 1993, Apr. 5, 1993, and May 26, 1993, respectively (attorney dockets 1497-4, 5, and 6), and 07/973,396 filed Nov. 10, 1992 (atty. dkt. 30-213).

BACKGROUND AND SUMMARY OF THE INVENTION

The present invention refers to a novel method and an apparatus for transporting solid particles from one chamber having solid particles therein into another chamber, for providing a solid flow gas seal, a controllable solid flow valve, or both, in e.g. a fluidized bed system.

The present invention especially relates to a method and an apparatus for transporting solid particles between two chambers in a bubbling or circulating fluidized bed systems. In fluidized bed reactors solid material may e.g. be transported from the reactor chamber to adjacent processing chambers for heat recovery, particle separation, or chemical or other processing. In circulating fluidized bed reactors, on the other hand, bed material is continuously recycled from a return duct (chamber) into the lower part of the reactor chamber.

Fluidized bed reactors are e.g. used in a variety of different combustion, heat transfer, chemical or metallurgical processes. Depending on the process different solid bed materials are fluidized and/or circulated in the systems. In combustion processes particulate fuel such as coal, coke, lignite, wood, waste or peat, as well as other particulate material such as sand, ash, sulfur absorbent, catalyst or metal oxides can be constituents of the fluidized bed.

Internal or external circulation or transportation of solid particles in fluidized bed systems takes place from one chamber having a higher pressure to another chamber having a lower pressure or from a chamber having a lower pressure to a chamber having a higher pressure. In transportation from a higher pressure to a lower pressure particles are forced to flow by the pressure difference between the two chambers, whereas in transportation from a lower pressure to a higher pressure it is known to transport particles by mechanical means, such as screw transporters, or by non-mechanical means, e.g. by using transportation gas.

Mechanical transporters are less reliable in hot surroundings, such as fluidized bed combustors, due to rapid erosion and clogging tendency.

When using non-mechanical means, for transporting solid particles from a chamber having a lower pressure to a chamber having a higher pressure, a gas seal or a gas lock must be provided between the chambers, in order to prevent non-desired flow of gas from the chamber having the higher pressure to the chamber having the lower pressure.

It is well known, as shown in U.S. Pat. No. 5,069,171, to provide a loop seal (J-valve) type of gas lock in the return duct of a circulating fluidized bed reactor (CFB). A sealing effect is achieved thereby by preventing the loop seal from becoming empty and by maintaining a high enough layer of solid material in the loop seal. Circulating bed material accumulated in the loop seal provides a pressure high enough to prevent gases from flowing from the reactor chamber at a high pressure through the return duct into the particle separator at a lower pressure. Solid material is allowed to flow by gravity from the loop seal into the reactor chamber or is transported from the loop seal by fluidizing air introduced therein.

Other types of gas seals are also known to be used in return ducts of CFB reactors. A seal pot type of gas seal is shown in U.S. Pat. Nos. 4,896,717 and 4,915,061, where circulating bed material is guided from the particle separator through a return duct into a seal pot connected to the reactor chamber. The solid material accumulated in the seal pot prevents gas from flowing from the reactor chamber into the return duct. Solid material is transported by fluidizing gas and overflows from the seal pot into the reactor chamber.

Another type of gas seal, called an "L-valve type" of gas seal, is shown in U.S. Pat. No. 4,538,549, in which the return duct in a CFB reactor is connected to the lower part of the reactor chamber through a rather lengthy horizontal duct. Circulating bed material is accumulated in the horizontal duct, preventing gas from flowing from the reactor chamber at a high pressure into the return duct at a lower pressure. Solid particles are transported by transporting gas through the horizontal duct into the reactor chamber. Known L-valve constructions have very long horizontal ducts with large cross sections. The ducts have to be long in order to build up enough particles in the duct to prevent gases from flowing therethrough into the return duct.

For providing efficient gas seals with the aforementioned known types of gas seals (large space-consuming loop seal constructions, seal pots, or L-valves) large amounts of circulating bed material are necessary. Further, when hot bed material is circulated in the return duct of a circulating fluidized bed system, complicated supports, heat seals, insulation arrangements and joints are necessary in the gas seal constructions for preventing damages caused by temperature differences in the gas seal during start ups and shut downs. Less space consuming, less vulnerable and less expensive gas seals are needed, especially in cooled structures.

According to the invention, a method and an apparatus for transporting solid particles from a first chamber having a bed of particles therein into another chamber is provided in which the above mentioned drawbacks are minimized. The invention also provides an improved gas seal arrangement between two chambers in a fluidized bed systems, an improved solid flow valve arrangement between two chambers in a fluidized bed systems, and an improved method for controlling the transportation of solid particles from one chamber into another chamber in a fluidized bed system.

According to the present invention there is provided a method for transporting solid particles from a first chamber having solid particles therein into an adjacent second chamber, the two adjacent chambers being separated by a partition wall having several narrow passages disposed in the partition wall, interconnecting the chambers, the method comprising the steps of: (a) Introducing transporting gas into the first chamber. And, (b) with the transporting gas, transporting solid particles as multiple solid flows from the first chamber to the second chamber through the narrow passages in the partition wall, so that the narrow passages act as a solid flow gas seal, a controllable solid flow valve, or both.

In a preferred embodiment of the invention, the narrow passages have a height (h) to length (l) ratio (h/l) less than the tangent of an angle α, the angle α being a characteristic angle of the solid material. The angle α is the maximum angle of a heap of solids at which the solid material can be gathered without solids spreading out or sliding downwards along the sides of the heap. In many applications the height to length ratio h/l is less than about 0.5.

The solid flow gas seal effect of a passage depends on the ratio h/l. The ratio h/l should, according to one preferred embodiment of the invention for horizontal passages, be less than 0.5 in order to prevent solids from flowing uncontrollably through the passages and for keeping a high enough solid surface level in the first chamber to prevent gas from flowing backwards through the passages. The smaller the vertical extension (h) the shorter passage can be used.

The cross section of the passages taken in the plane of the partition wall are preferably rectangular slot like, but passages having square or round cross sections may be preferable in some applications.

The passages can be made inclined having outlet ends on a higher level than inlet ends for preventing coarse material from accumulating at the inlet end of the passages. In inclined passages, the length (l) of the passage can be further decreased compared to horizontal passages having the same cross section. In some applications the passages may be only partly inclined, so that their bottom is inclined whereas the upper border area is horizontal. It is also possible to make the passages inclined in one direction at their inlet ends and inclined in an other direction at their outlet ends. The cross section of the passages would then have a V-form or an inverted V-form. In some applications a step wise ascending or descending cross section may be used.

The inlet side of the passages may be throttled in order to prevent particles large enough to clog the passages from entering them. Alternatively the passages may be funnel shaped with a diameter increasing towards the outlet side.

According to another preferred embodiment of the invention there are provided in a partition wall between two chambers several slot like passages or openings formed on top of each other in a frame like construction. The chambers being e.g. a chamber in the lower part of a return duct, a combustion chamber in a fluidized bed combustor or a heat exchanger chamber connected to the combustion chamber. The several slot like passages provide several separate passages for solid flows through the partition wall. The total vertical extension $h_{tot}$ needed for an imaginary single large passage can according to one important aspect of the invention thereby be divided into several vertical extensions $h_1$, $h_2$, $h_3$, . . . , each divided vertical extension being just a fraction of the total $h_{tot}$ needed. The total cross sectional area of the passages is determined by the mass flow needed, e.g. for heat transfer in an internal or external heat exchanger.

It is further an important aspect of the present invention that the length (l) of each passage can be decreased in the same proportion as the vertical extension is decreased, without the loop seal effect of the passage being decreased. According to one practical aspect of the present invention short passages, only long enough to extend through a common membrane wall, can be used for transporting particles from one chamber to another, while simultaneously providing a gas seal.

Short passages according to the present invention may easily be included in common water tube walls or membrane walls. The passages may be formed in the fins combining tubes in the wall. The passages may be arranged in the wall in gill like configurations, i.e. "gill seals", combined in a prefabricated frame.

The present invention provides an improved gas seal which is small and can easily be included in existing reactor constructions. The new gas seal minimizes the need for complicated joints, heat insulations or supports.

The present invention also provides a method for controlling solid flow from the first chamber into the second chamber. The transporting gas transporting solids thorough the passages into the second chamber may be introduced through nozzles or openings in the bottom of the first chamber or/and through nozzles or openings at different levels in a side wall preferably opposite to the partition wall. By controlling the flow of transporting gas through different nozzles at different levels and locations it is possible to control the amount of solids flowing through the passages. Transporting gas introduced through nozzles in the bottom of the first chamber transports solid particles through all passages in the partition wall, whereas transporting gas introduced through nozzles higher up, on a side wall, primarily transports solid particles through passages higher up in the first chamber. Nozzles disposed too close to the passages transport less solid material than nozzles spaced a significant distance from the passages. The amount of solids transported through the passages may, of course, also be controlled by the amount of transporting gas introduced.

By utilizing the present invention it is thereby possible to control the amount of solid particles circulating from the first into the second chamber, e.g from a return duct into the reactor chamber or from a combustion chamber into a heat exchanger chamber.

Air from the fluidized bed reactor windbox or air from a separate blower, preferably at a slightly higher pressure, or another cheap gas, e.g. recycled flue gas, may be used as transporting gas. Inert gases could also be used especially if inert, non-oxidizing conditions are needed.

According to one embodiment of the invention are bed particles in a fluidized bed combustor transported from the combustion chamber directly or through a by-pass chamber into an adjacent heat exchanger chamber through narrow slot like passages or channels, which are arranged in a gill-like formation, in a partition wall separating the heat exchanger chamber or when using a by-pass chamber the by-pass chamber from the combustion chamber. Particle flow through the passages, and thereby heat recovery in the heat exchanger, is controlled by controlling the introduction of transporting gas guiding particles through the passages into the heat exchanger or by-pass chamber. Particles may be recycled through the wall separating the heat exchanger chamber from the combustion chamber with transporting gas and overflow arranged in the upper part of the heat exchanger chamber or through another set of slot like passages or channels in the lower part of the heat exchanger chamber.

According to another embodiment of the present invention circulating bed particles in a circulating fluidized bed (CFB) reactor are reintroduced into the reactor chamber from the return duct through "gill seal" passages provided in the lower part of the return duct. A bed of circulating particles is formed in the return duct. The bed moving slowly downwardly as solid material therefrom is reintroduced into the combustion chamber, new solid material being continuously added on top of the bed. The height of the bed may be controlled by controlling the transporting gas flows reintroducing solid material through the "gill seal" passages from the return duct into the combustion chamber.

The present invention also provides a self control system when bed levels in the return duct are too low, transporting gas tends to flow upwards through the bed to the upper part of the return duct without transporting solid particles through the passages. This leads to an increase of bed material in the return duct. Thereafter at a certain bed level transportation gas is prevented by the height of the bed to flow upwards through the bed and starts to flow through the passages and to transport solid particles through the passages.

The present invention also provides a method in a CFB reactor for recycling solid material from the return duct to one or several different relatively high levels in the reactor chamber. The passages according to the present invention provide efficient gas seals preventing gas from flowing into the return duct. Earlier known technology loop seals and L-valves would be more complicated and space consuming and unsuitable to be used in the upper parts of a CFB reactor.

According to still another embodiment of the invention there is provided an apparatus for transporting solid particles from a first chamber having solid particles therein to an adjacent second chamber, the two adjacent chambers being separated by a partition wall having a passage interconnecting the chambers, the apparatus comprising: Gas inlet means, for introducing transporting gas into the first chamber. And, two or more narrow passages disposed one on top of the other in the partition wall interconnecting the chambers, for providing a solid flow gas seal, a controllable solid flow valve, or both.

Horizontal passages according to the invention preferably have a height (h) to length (l) ratio (h/l) less than 0.5. The narrow passages disposed in the partition wall may be of a size which allows only particles of a predetermined size or smaller to flow from the first chamber to the second chamber. The passages thereby preventing larger objects from flowing from e.g. a combustion chamber into a heat exchanger connected thereto or preventing large ash particles from flowing from a return duct into a combustion chamber. Maximum size of passages having round or square cross sections could be about 50 mm in diameter. Passages having horizontal slot like cross sections would preferably have maximal vertical extensions of about 50 mm. The maximum size used depending on the material to be processed in the fluidized bed.

It is the primary object of the present invention to provide an efficient and effective gas seal and control valve for use with fluidized beds or the like, which has a simple construction. This and other objects of the invention will become clear from an inspection of the detailed description of the invention and from the appended claims.

DETAILED DESCRIPTION OF THE DRAWINGS

Figure 1:
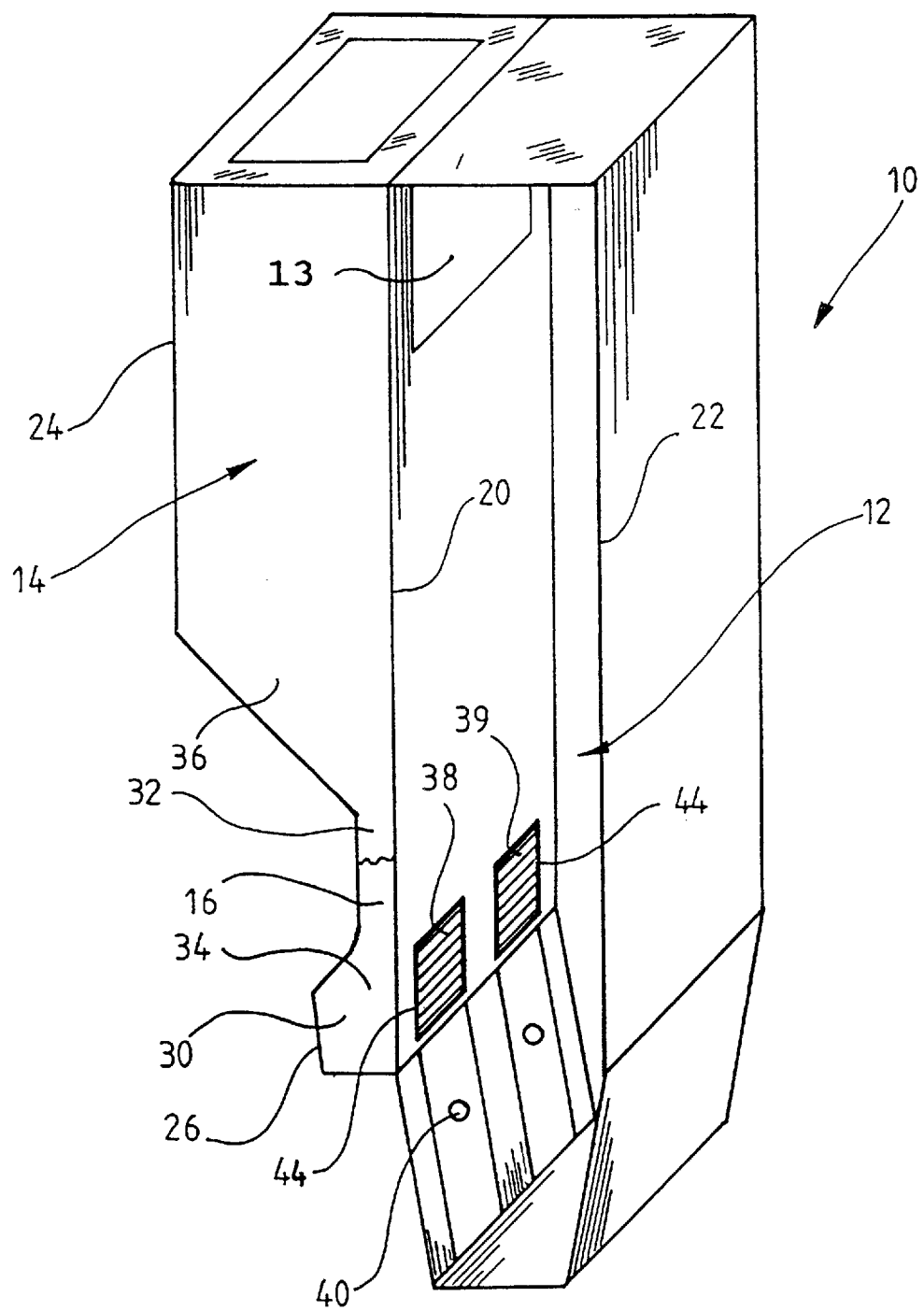
FIG. 1 is a schematic isometric cross section through a circulating fluidized bed apparatus according to one exemplary embodiment of the invention.

FIG. 1 shows a circulating fluidized bed combustor 10, having a combustion chamber 12 designed to have an expanded fluidized bed of particles therein. A particle separator 14 is connected to the upper part of the combustion chamber 12, for separating particles entrained with the mixture of flue gases and solid material being discharged from the combustion chamber through duct 13. A return duct 16 is provided for recirculating separated solid material from the separator into the lower part of the combustion chamber 12.

Figure 2:
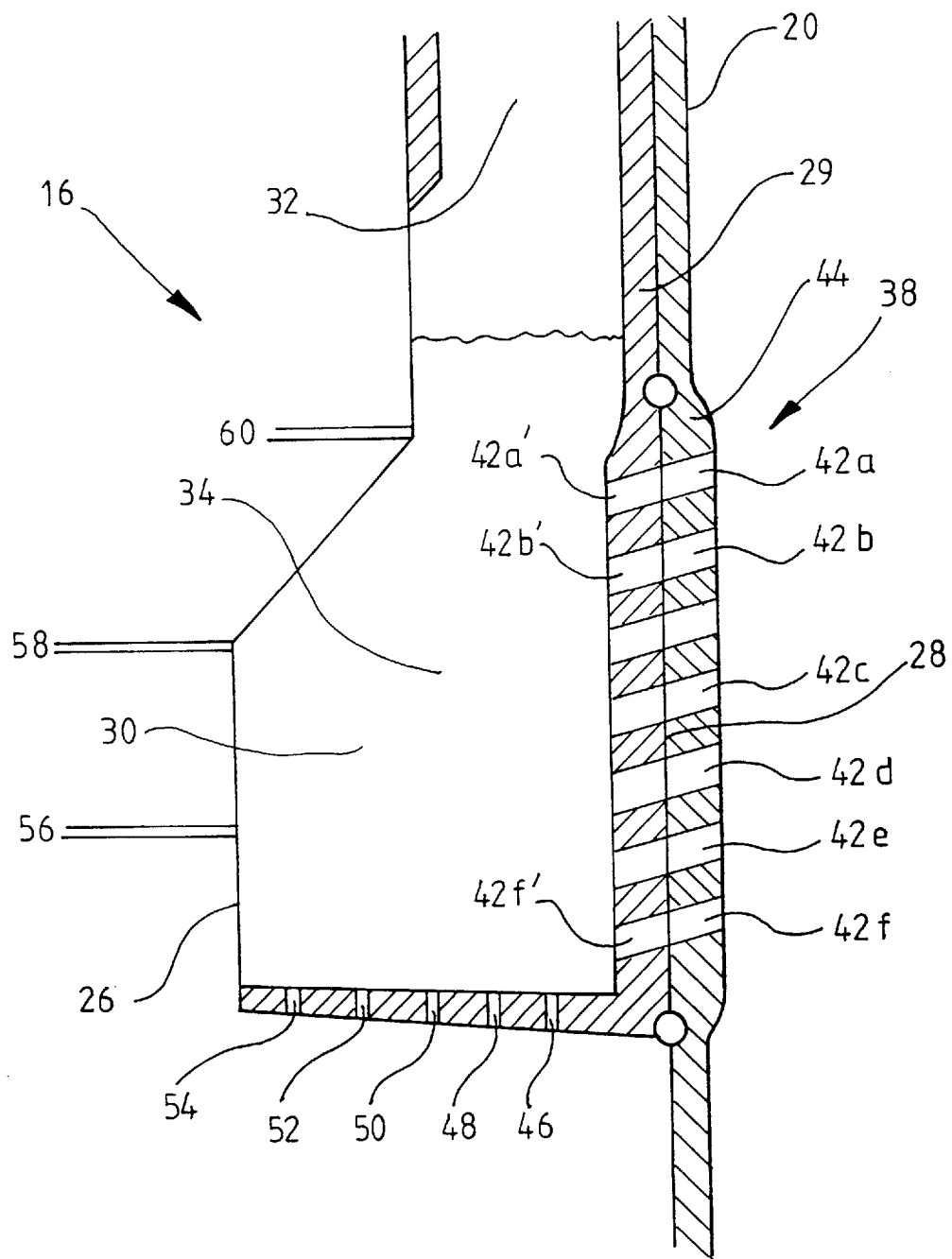
FIG. 2 is a partial enlarged cross section of the lower part of the return duct and the "gill seal" passages in FIG. 1.

The walls 20, 22, 24, 26, 28 of the combustion chamber 12, the separator 14 and the return duct 16 are preferably constructed of water wall panels or membrane panels protected partly by a refractory lining 29, as shown in FIG. 2.

The lower part 30 of the return duct 16, as shown in FIG. 1 and FIG. 2, has a larger horizontal cross section than the upper part 32 of the return duct 16. A bubbling bed 34 of recycling particles is provided in the lower part 30. A gas space 36 extends from the bed 34 to the particle separator 14. Inlets 38 and 39 for recycling bed material from the return duct 16 into the combustion chamber 12 are disposed in the lower part 30 of the combustion chamber. Fuel inlets 40 are disposed primarily beneath the inlets 38, 39, so that fuel and recycled particles are immediately mixed, when introduced into the combustion chamber 12. Fuel may be introduced into the lower part 30 of the return duct 16 if desired.

Heat transfer surfaces, such as a superheater surfaces, not shown in the drawings, may be provided in the bubbling bed 34 between the two inlets 38 and 39 in a heat transfer zone.

The inlets 38, 39 preferably comprise narrow slot like inlet passages 42a, 42b, 42e, 42f (see FIG. 2) disposed one on top of the other in a frame like structure 44, connecting the lower part 30 of the return duct 16 with the lower part of the combustion chamber 12. Each of the passages 42a–42f preferably has a height (h) to length (l) ratio (h/l) of less than 0.5, and typically h<50 mm. As illustrated in FIG. 2, the passages 42a–42f preferably slant upwardly slightly from duct 16 to chamber 12, e.g. about 10–20 degrees (about 15 degrees in FIG. 2).

The material of the bed 34 in the return duct 16 covers the inlet passages 42a–42f, and the solid flow inside the inlet passages 42a–42f constitutes in combination a gas seal, preventing combustion chamber gases from flowing from the combustion chamber 12 at a high pressure $p_1$ through the passages 42a–42f and the bed 34 into the gas space 36 at a lower pressure in the upper part 32 of the return duct 16.

Transporting gas (e.g. air, inert gas, recycled flue gas or the like) may be introduced into the lower part 30 of the return duct 16 through bottom gas inlets 46, 48, 50, 52 and 54 (FIG. 2), or a nozzle, such as the type commonly used in fluidized beds.

The exclusive, or additional, transporting gas may be introduced through upper gas inlets 56, 58 and 60 (FIG. 2). Transporting gas introduced through bottom gas inlets 46–54 transports particles from the lowermost and upper parts of the bed 34 towards inlet passages 42a–42f. Transporting gas introduced through nozzle 56 transports more particles than transporting gas introduced through nozzle 58, which transports solid material mostly through the uppermost of the inlet passages 42a–42c. At low loads, gas may be introduced mainly through the uppermost nozzle 60, for transporting only small amounts of solids and maintaining a suitable bed level in the return duct 16.

By controlling the transporting gas flows through different nozzles 46–60, optimal solids flow can be established through all inlet passages 42a–42f, at varying process conditions, for recycling desired amounts of the material of bed 34 through the passages 42a–42f into the combustion chamber 12 and simultaneously securing an efficient solids flow gas seal in all passages during varying process conditions, e.g. preventing the bed level from decreasing below a level which would allow gas to flow from the combustion chamber 12 through the passages 42a–42f into the return duct 16. The gas seal effect of the bed itself should also be kept at a suitable level. Control of the transporting gas flows also controls the valve action of the passages 42a–42f.

With a high load of bed material being recycled through the return duct, transporting gas can be introduced through all or nearly all nozzles 46 to 58 in order to entrain maximal amounts of solid particles with the transporting gas for transportation through passages 42a–42f. At low load conditions, only a small amount of bed material has to be transported through the passages 42a–42f. This may be done by introducing the transporting gas mainly through nozzles 54–60, whereby the bed 34 portion closest to inlet passages 42e and 42f, as well as closest to the nozzles 46–52, is affected very little by the transporting gas, which leads to decreased amounts of bed material being recycled through the passages 42a–42f. If there is a low bed 34 level, transporting gas introduced through nozzles 60 and 58 may flow up into the gas space 36 of the return duct without transporting bed material at all.

Care must, however, be taken to ensure that a solid flow gas seal is established in the passages. A gas seal can in some cases be established, especially in the lowermost passages 42e and 42f, by filling up the passages with solid particles. An actual flow of particles through the passages 42a–42f is not necessary in order to achieve a gas seal if there is a high enough level of solids in the return duct to prevent gases from flowing therein.

In a heat transfer zone between gas seal zone inlets 38 and 39 fluidizing gas may be introduced through nozzles for controlling the heat transfer and for transporting solid material at desired velocity from the heat transfer zone towards the inlets 38 and 39.

The frame structure 44 as shown in FIGS. 1 and 2 can easily be inserted in a conventional tube wall or membrane wall, such as wall 20. The frame 44 and the slot like inlet passages 42a–42f therein can be prefabricated into the wall 20 when covering the wall with refractory lining 29. Tubes in the tube wall 20 can be bent (not shown in the drawing) during construction to provide the opening needed for the frame construction 44. A mold, for allowing utilization of the slot like passages 42a–42f, made of Styrox or other combustible material may be inserted in the frame 44 between the tubes, before covering the tube wall 20 with refractory lining 29. The mold is burnt away during heating of the refractory lining 29, leaving only slot like passages or openings 42a'–42f' in the remaining wall 28, the passages 42a'–42f' aligned with the passages 42a–42f.

Figure 3:
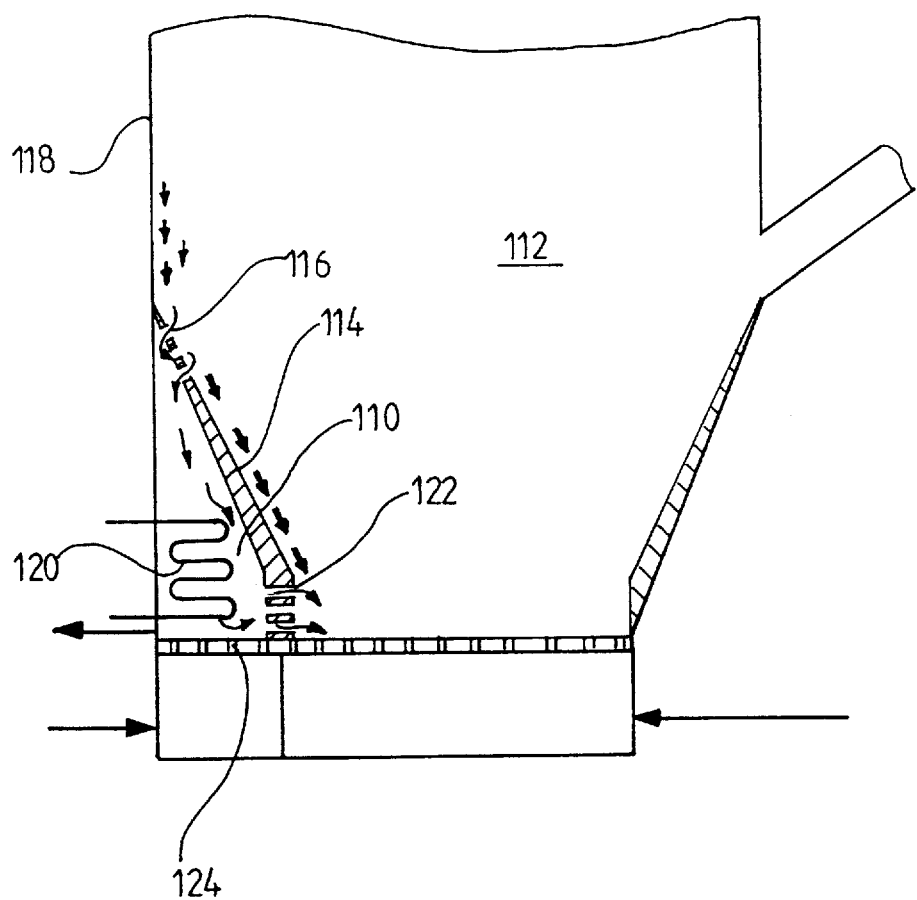
FIG. 3 is a schematic cross sectional view of the lower part of a fluidized bed combustion chamber according to another exemplary embodiment of the present invention.

FIG. 3 illustrates a further embodiment of the present invention. In this embodiment a heat exchanger chamber 110 is connected to a reactor chamber 112, for recovering heat from the bed material (not shown) in the reactor chamber 112 by internally recycling bed material through the heat exchanger chamber 110.

The heat exchanger chamber 110 is connected to the inclined refractory lined wall portion 114 of the lower part of the reactor chamber wall 118. Inlet openings 116 are provided in the upper end of the refractory lined wall portion 114. Particles flowing downward along a side wall 118 are captured by the openings 116 and flow into the heat exchanger chamber 110. Liquid circulating heat transfer surfaces 120 are disposed in the heat exchanger chamber 110.

Slot like outlet passages 122 according to the invention are provided in the lowermost part of the refractory lined wall portion 114 for reintroducing particles into the reactor chamber 112. The passages 122 for reintroducing particles into the reactor chamber 112 constitute a solid flow gas seal. The passages 122 are narrow slots disposed one on top of the other, with each slot forming a separate L-valve gas seal.

Transporting gas (e.g. air) is introduced through nozzles 124 in the bottom of the heat exchanger chamber for transporting particles from the heat exchanger chamber into the reactor chamber and for providing a solid flow gas seal in the passages 122. Other nozzles (not shown in the drawing) for introducing fluidizing gas may be utilized in heat transfer zones in the heat exchanger chamber 110 for controlling the heat transfer.

Figure 4:
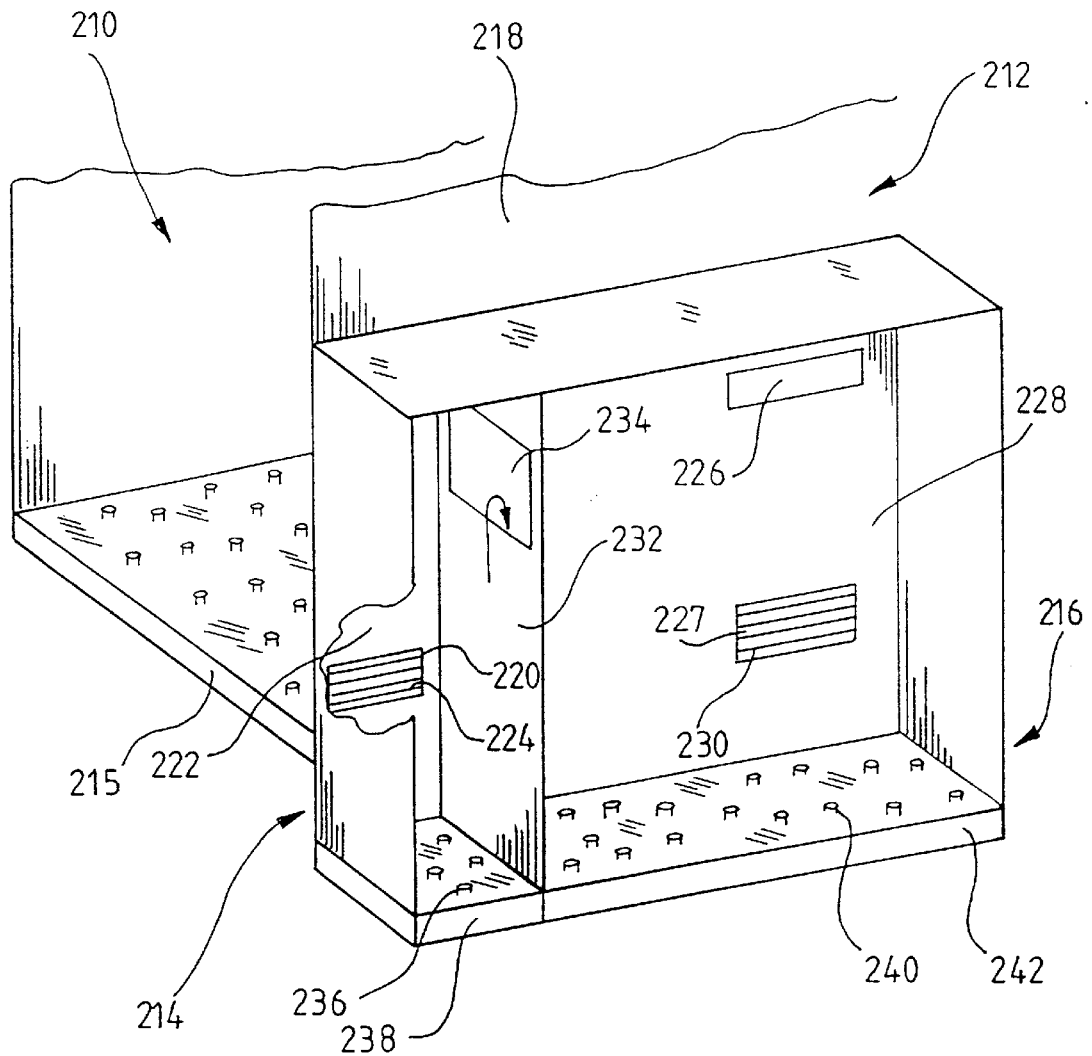
FIG. 4 is a schematic isometric view, with the side walls cut away for clarity of illustration, of an exemplary by-pass chamber and heat exchanger chamber connected to a combustion chamber according to the present invention.

FIG. 4 shows another embodiment according to the present invention. The figure shows a part of a reactor chamber 210 in a fluidized bed reactor and a housing 212 disposed adjacent the reactor chamber 210 and including a lifting chamber 214 and a processing chamber 216. The housing 212 is disposed partly back to back with one side wall 218 of the reactor chamber 210. The housing is divided by a wall 232 into the lifting chamber 214 and the processing chamber 216. An opening 234 in the upper part of the wall 232 connects the chambers 214, 216.

An outlet 220 from the reactor chamber 210 is provided at a first vertical level in the common wall portion 222 between the lifting chamber 214 and the reactor chamber 210. Solid particles flow through the outlet 220 from the reactor chamber 210 into the lifting chamber 214 due to pressure difference between the chambers. Narrow slot like passages 221, forming a "gill seal", according to the present invention, are disposed in the outlet 220 to prevent gas from flowing from one chamber into the other and for preventing objects larger than a predetermined size from flowing from the reactor chamber 210 into the lifting chamber 214.

Air nozzles 236 are disposed in the lifting chamber 214 for pneumatically transporting solid particles through the opening 234 into the processing chamber 216. In the common wall 228 between the reactor chamber 210 and the processing chamber 216, two inlets 226 and 227 are provided for transporting solid particles back into the reactor chamber 210. Transporting gas and solid particles entrained therein flow from the lifting chamber 214 through inlet 226 into the reactor chamber 210.

The second inlet 227, disposed within the bed of solid particles in the processing chamber 216, comprises narrow slot like passages 230 one on top of the other according to the present invention. Solid particles flow through the passages 230 by gravity or are transported therethrough by the fluidization gas being introduced through nozzles 240. Solid flow gas seals are established in the second inlet 227 preventing uncontrollable solid flow from the processing chamber 216 into the reactor chamber 210.

Figure 5:
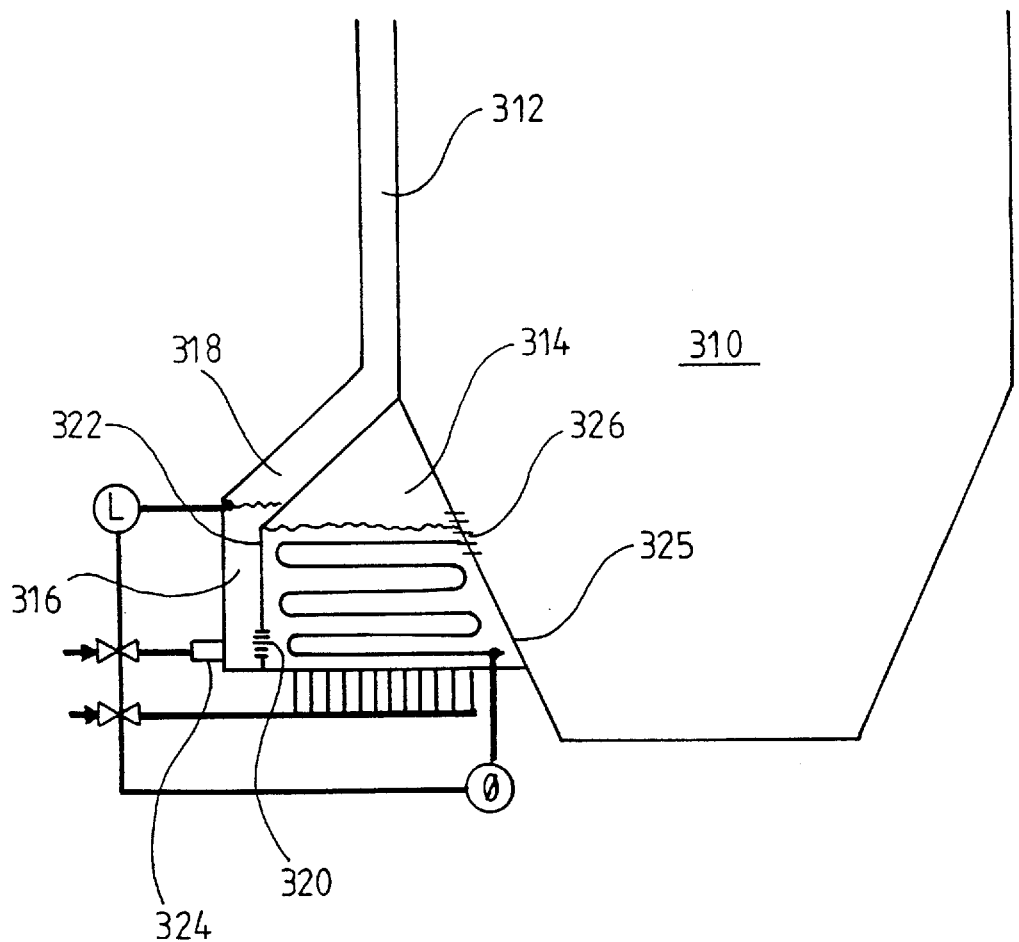
FIG. 5 is a schematic cross sectional view of the lower part of a circulating fluidized bed reactor according to still another exemplary embodiment of the present invention.

FIG. 5 shows still another exemplary embodiment according to the present invention. FIG. 5 shows a reactor chamber 310 in a CFB reactor having a return duct 312 and a heat exchanger chamber 314 connected thereto. A bed 316 of solid particles is accumulated in the lower part 318 of the return duct 312. Solid flow passages 320 according to the present invention are provided in a partition wall 322 between the lower part 318 of the return duct 312 and the heat exchanger chamber 314. Transportation gas is introduced through nozzle 324 into the lower part of the return duct 312 for transporting particles through passages 320 into the heat exchanger chamber 314 and for establishing a solid flow gas seal between the return duct 312 and the heat exchanger chamber 314.

Solid material introduced into the heat exchanger chamber 314 is fluidized therein and recycled into the reactor chamber 310 by overflow through an opening 326. Additional passages, according to the present invention, may also be provided in the lower part of the partition wall 325 between the heat exchanger chamber 314 and the reactor chamber 310 if desired.

What is claimed is:

1. A method for transporting solid particles from a first chamber having solid particles therein into an adjacent second chamber, the two adjacent chambers being separated by a partition wall having several horizontal or inclined passages disposed one above the other in the partition wall, interconnecting the chambers, the method comprising the steps of:

(a) introducing transporting gas into the first chamber; and
   (b) with the transporting gas, transporting solid particles as multiple solid flows from the first chamber to the second chamber through the horizontal or inclined passages disposed one above the other in the partition wall, so that the passages act as a solid flow gas seal, a controllable solid flow valve, or both a solid flow gas seal and a controllable solid flow valve.

2. A method of transporting solid particles according to claim 1, wherein steps (a) and (b) are practiced by introducing solid particles in a fluidized bed system from a bed of solid particles in the first chamber into solid particles in a fluidized state or in a pneumatic conveying state in the second chamber.

3. A method of transporting solid particles according to claim 1, wherein step (b) is practiced by transporting the particles through passages each having a height (h) to length (l) ratio (h/l) of less than about 0.5.

4. A method of transporting solid particles according to claim 1, wherein step (a) is practiced by introducing transporting gas through the bottom of the first chamber, one side wall opposite to the partition wall in the first chamber, or both.

5. A method of transporting solid particles according to claim 1, wherein steps (a) and (b) are practiced to transport solid particles from a combustion chamber in a fluidized bed combustor into an adjacent processing chamber having a fluidized bed of particles therein.

6. A method of transporting solid particles according to claim 1, wherein steps (a) and (b) are practiced to recycle circulating solid particles in a fluidized bed combustor from an internal heat exchanger chamber having a fluidized bed of solid particles therein into a combustion chamber of the combustor.

7. A method of transporting solid particles according to claim 1, wherein steps (a) and (b) are practiced by transporting solid particles in a circulating fluidized bed combustor from a bed of solid particles in a return duct into the combustion chamber of the combustor.

8. A method of transporting solid particles according to claim 1, wherein step (b) is practiced by transporting solid particles as multiple substantially horizontal solid flows through passages each having a height less than about 50 mm.

9. A method of transporting solid particles as recited in claim 1 wherein step (a) is practiced by introducing transporting gas only through one side wall opposite to the partition wall in the first chamber.

10. Apparatus for transporting solid particles comprising:
    a first chamber having solid particles therein;
    an adjacent second chamber;
    a partition wall separating said first and second chambers;
    gas inlet means, for introducing transporting gas into said first chamber; and
    two or more horizontal or inclined passages disposed one on top of the other in said partition wall interconnecting said chambers, for providing a solid flow gas seal, a controllable solid flow valve, or both a solid flow gas seal and a controllable solid flow valve.

11. An apparatus according to claim 10 wherein said passages each have a height (h) to length (l) ratio (h/l) less than about 0.5.

12. An apparatus according to claim 10 wherein said two or more passages disposed one on top of the other are combined into a joint gill-like configuration in a frame in said partition wall, said passages being horizontal and each having a height less than about 50 mm.

13. An apparatus according to claim 12 wherein two or more of said frames are disposed side by side, spaced horizontally from each other, in said partition wall.

14. An apparatus according to claim 13 wherein said gas inlet means comprise a plurality of transporting gas nozzles disposed in said first chamber in front of said frames for transporting solid particles through said passages.

15. An apparatus according to claim 14 further comprising heat transfer surfaces disposed in said first chamber in zones adjacent intervening spaces between said frames.

16. An apparatus according to claim 12 wherein said passages each have a height (h) to length (l) ratio (h/l) less than about 0.5.

17. An apparatus according to claim 16 wherein said passages make an angle of at least about 10 degrees with respect to the horizontal.

18. An apparatus according to claim 10 wherein said passages make an angle of at least about 10 degrees with respect to the horizontal.

19. An apparatus according to claim 10 wherein said first chamber is a combustion chamber and said second chamber is a chamber for processing particles.

20. An apparatus according in claim 10 wherein said first chamber is a processing chamber and said second chamber is a combustion chamber.

21. An apparatus according to claim 10 wherein said first chamber is a return duct and said second chamber is a combustion chamber.

22. An apparatus according to claim 10 further comprising a third chamber adjacent said second chamber and separated by a second partition wall having two or more horizontal or inclined passages disposed one on top of the other in said second partition wall interconnecting said second and third chambers, for providing a solid flow gas seal, a controllable solid flow valve, or both; and wherein said first chamber comprises a combustion chamber, and said second chamber comprises a chamber for transporting and processing particles.

23. An apparatus according to claim 10 wherein said partition wall within said first chamber is lined with refractory.

24. An apparatus according to claim 23 further comprising two or more narrow passages disposed in said refractory lining lined with said passages in said partition wall.

* * * * *